Dec. 27, 1966  E. BAVERS  3,293,698
ROTATIONAL MOLDING APPARATUS FOR THERMOPLASTIC ARTICLES
Filed Jan. 3, 1964  2 Sheets-Sheet 1

INVENTOR.
ELLIOTT BAVERS
BY
*K.M. Helfand*
ATTORNEY

Dec. 27, 1966  E. BAVERS  3,293,698
ROTATIONAL MOLDING APPARATUS FOR THERMOPLASTIC ARTICLES
Filed Jan. 3, 1964  2 Sheets-Sheet 2
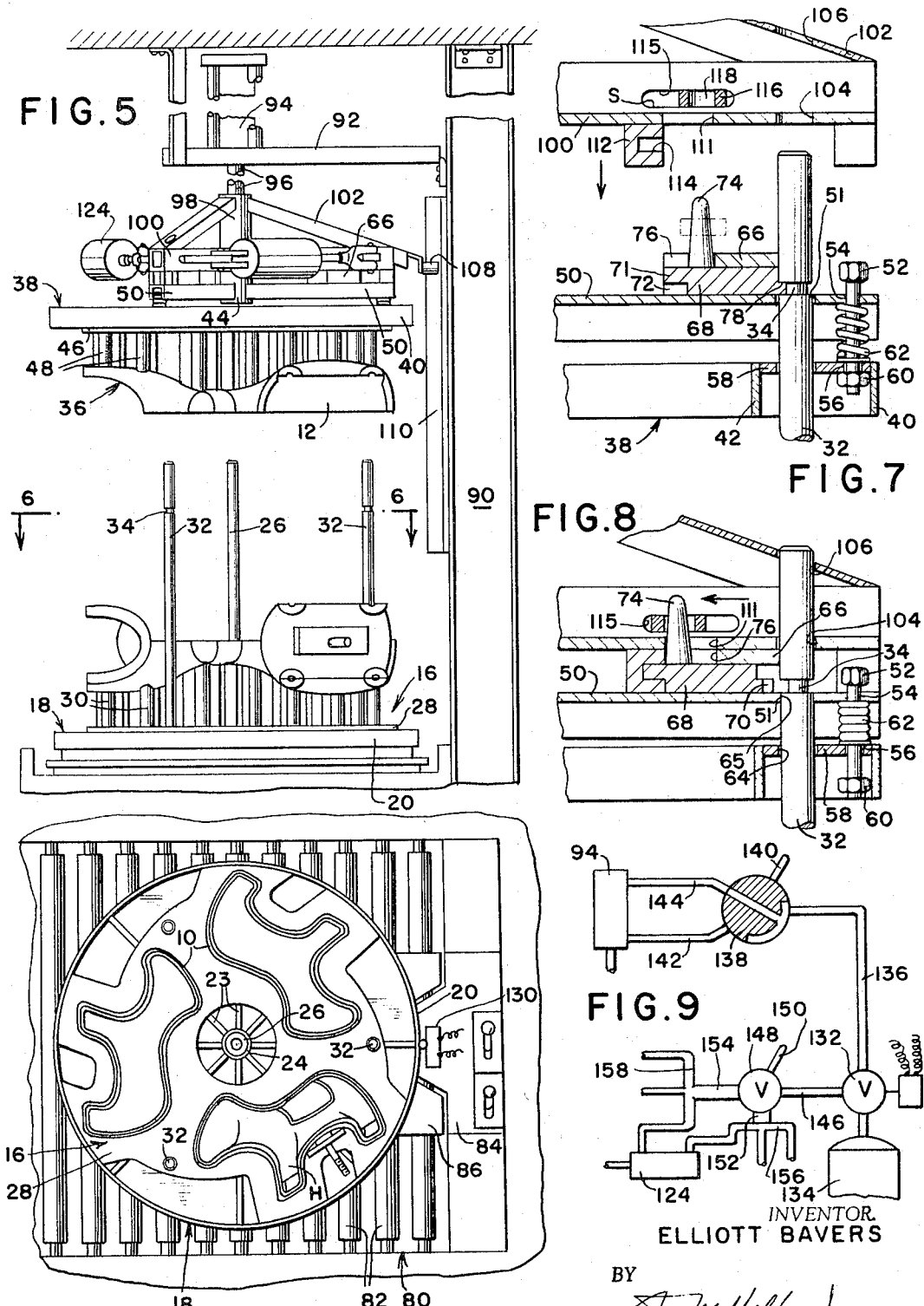
INVENTOR.
ELLIOTT BAVERS
BY
ATTORNEY

United States Patent Office 3,293,698
Patented Dec. 27, 1966

3,293,698
ROTATIONAL MOLDING APPARATUS FOR THERMOPLASTIC ARTICLES
Elliott Bavers, 2321 Ave. I, Brooklyn, N.Y. 11800
Filed Jan. 3, 1964, Ser. No. 335,594
19 Claims. (Cl. 18—43)

The present invention relates to a molding apparatus and, more particularly, to a two-section mold frame for multiple-part molds, for the rotational molding of articles from powdered thermoplastic material, and to mechanical apparatus for handling the mold frame sections between curing and removing the molded articles.

More specifically, the present invention is directed to the provision of a two-section mold frame for multiple-part molds and to automatic, mechanical means for positioning and locking the mold frame sections together before insertion into the curing oven and for mechanically and automatically unlocking and separating the mold sections from one another and maintaining them in separated arrangement, after curing and cooling is completed, to permit removal of the molded articles and the refilling of the molds.

It is an object of the present invention to provide a mold frame, of the character described, which is capable of supporting the parts of one or more molds for the simultaneous molding of one or more articles.

It is another object of the present invention to provide a mold frame handling apparatus, of the character described, which substantially eliminates all manual labor in the assembling and locking of the mold frame sections and unlocking and separating the same, and maintaining them in separated state during the portion of the molding cycle involving removal of molded articles and refilling of the molds with molding materials.

It is another object of the present invention to provide molding apparatus, of the character described, capable of greatly speeding up the molding cycle to make possible the molding of articles.

It is still another object of the present invention to provide molding apparatus, of the character described, which is of relatively simple construction, which is strong, sturdy and durable, and requires a minimum of care.

It is a further object of the present invention to provide molding apparatus, of the character described, which is simple and easy to operate.

It is yet a further object of the present invention to provide molding apparatus, of the character described, which is relatively compact and requires a minimum of floor space for its installation and operation.

The foregoing and other objects of the molding apparatus of the present invention will become more readily apparent to those skilled in the art from the embodiment shown in the accompanying drawings, and from the description following. It is to be understood, however, that such embodiment is shown by way of illustration only, to make the principles and practice of the invention more readily comprehensible, and without any intent of limiting the invention to the specific details therein shown.

In the drawings:

FIG. 5 is a view similar to that of FIG. 2 showing the upper mold frame section unlocked and separated from the lower frame section and held in elevated position by the frame-handling apparatus;

FIG. 6 is a view taken on the plane of line 6—6 of FIG. 5, rotated through a 90° angle;

FIG. 7 is a fragmentary, sectional view, taken on line 7—7 of FIG. 4, partly in section, to show structural details;

FIG. 8 is a view similar to that of FIG. 7, after engagement of the upper frame section by the elevating and locking and unlocking structure, and the releasing of the upper frame section from the lower frame section; and FIG. 9 is a schematic view of one type of partly electrically and partly mechanically controlled pneumatic system for the operation and control of the mold frame-handling apparatus.

Generally stated, the present invention consists of the combination of a mold frame structure comprised of a lower base frame section supporting a lower part of one or more molds, and an upper frame section supporting complementary portions of the mold or molds, which is guided on the lower frame section for vertical movement relative thereto into and out of position of matching the lower mold sections; the two frame sections having co-operating, releasable means for interlocking them; and a stationary apparatus which, when the mold frame structure is disposed in servicing position, is capable of unlocking the mold sections at the end of a molding cycle at the same time interengaging one of the mold frame sections and is movable to separate the interengaged mold frame sections from the other, to permit removal of the molded articles and refilling of the molds; and, after such refilling, is movable to re-assemble the mold frame sections and seal the molds and lock the mold frame sections together, simultaneously being disengaged from the mold frame section it had been interengaged with.

Figure 1:
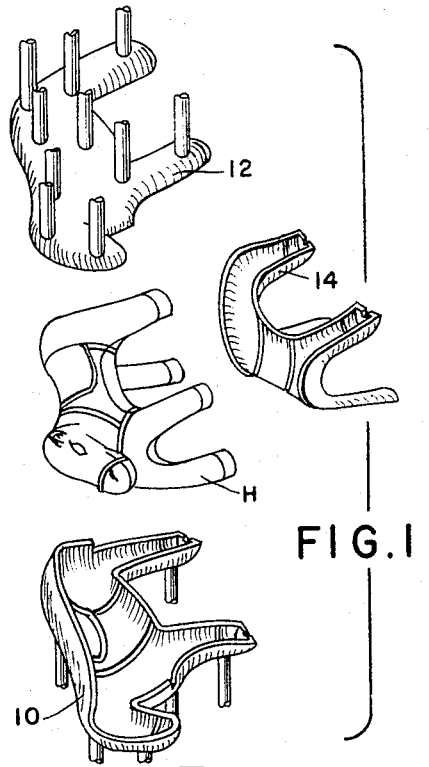
FIG. 1 is a fragmentary, more or less diagrammatic exploded view of a three-part mold for the mold frame of the present invention, with the mold part supporting posts shown in fragment.
Figure 2:
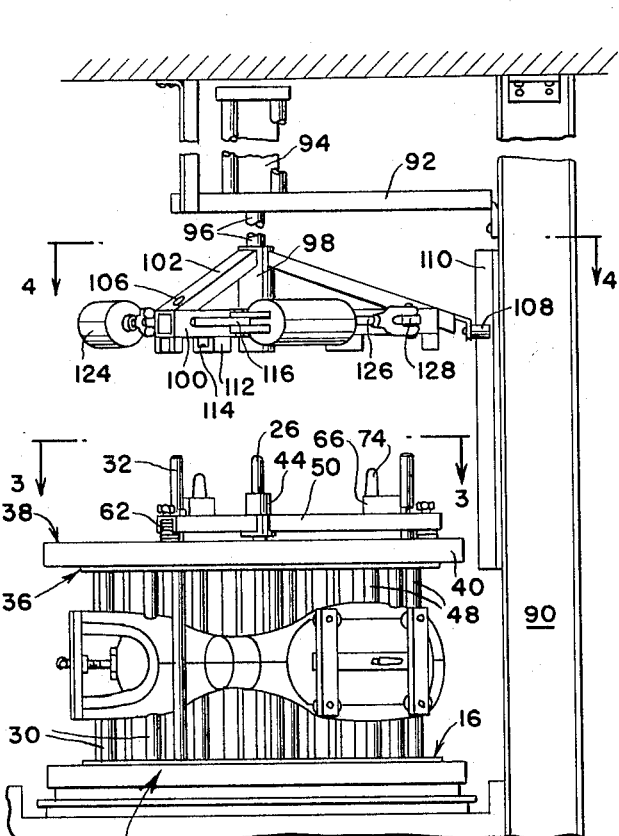
FIG. 2 is a front elevational view of the mold frame and mold frame-handling apparatus of the invention, shown with the mold frame in locked position and with the mold frame elevating, locking and releasing mechanism disengaged from the mold frame.

More specifically stated, the apparatus of the present invention is illustrated in the drawings as being arranged for operating with a three-section mold, as shown in FIG. 1, consisting of a lower mold part 10, an upper mold part 12, and a third mold part 14, which may interfit with portions of the upper and lower mold parts 10 and 12. These mold parts are illustrated as designed for the molding of a hobby horse H.

One or more, as three, lower mold parts 10, are supported on the lower mold frame section, generally designated as 16.

Such lower mold frame section 16, is shown to comprise a base portion, preferably circular, in the form of a spider, generally designated as 18, formed of a pair of concentric rings 20 and 22, interconnected by spokes 23, radiating from a center hub 24, which supports a central guide post 26. The spider 18 mounts a plate 28, on which are supported a plurality of upright mold part supplying posts 30, which may vary in height, to support the lower mold parts 10, at the appropriate angle for interfitting with the other mold parts. The plate 28 also supports a plurality, such as three, of upright guide and lock posts 32, preferably equidistantly spaced from the center of the base and from one another and projecting to a substantial height above the mold parts 10; each post 32 having an annular groove 34, formed therein adjacent its top end.

Figure 3:
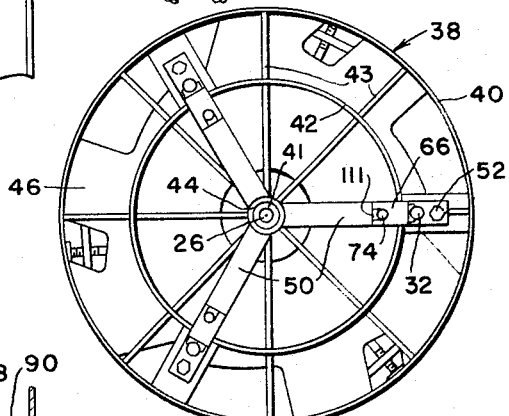
FIG. 3 is a view taken on the plane of line 3—3 of FIG. 2.
Figure 4:
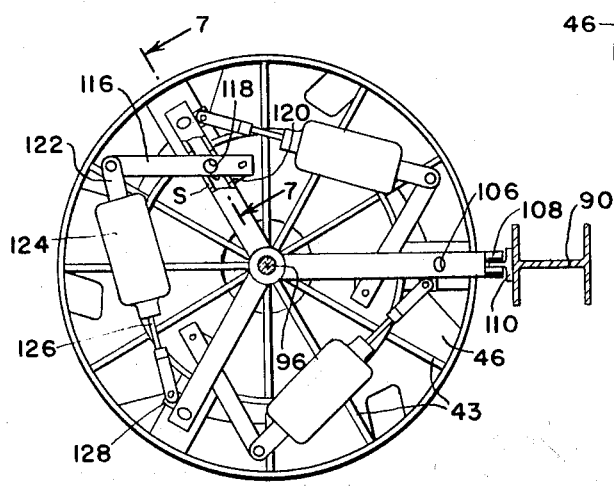
FIG. 4 is a view taken on line 4—4 of FIG. 2.

The mold frame of the invention also comprises an upper frame section, generally designated as 36, which consists of a base portion 38, which may also be of circular shape and in spider form and may also include a pair of concentric rings 40 and 42, connected by spokes 43, that radiate from a tubular center hub 41 (FIG. 3). The spider 38 supports on its underside a plate 46, on which are dependently secured a plurality of mold-parts supporting posts 48, that support the upper mold frame parts 12; the height of such posts 48 being arranged to support such mold parts at the appropriate angle for interfitting with the other mold parts.

A tubular hub 44 is disposed above the spider 38, concentrically with it, and has radiating therefrom a number of arms 50, equal to the number of guide and lock posts 32. The arms 50 are preferably of inverted channel shape and are arranged at such angle to one another that an opening 51, formed in the top wall of each of them may be arranged to be fitted over a post 32. The other end of each arm 50 is connected loosely to the spider 38 by a bolt 52, passing through an opening 54, in the top wall of the arm 50 and through an opening 56, formed in a plate 58, secured between the inner and outer rings 40 and 42 of the spider; the bolt 52 being engaged from the underside of plate 58 by one or more lock nuts 60, and having mounted thereover intermediate the top wall of the arm 50 and the plate 58 an expansion coil spring 62. The plates 58 are each formed with another opening 64, inwardly of opening 56 which are so arranged that each of them will fit over one of the guide posts 32.

Mounted on the top wall of each of the arms 50 immediately adjacent to and inwardly of opening 64 is a tubular guideway 66, of preferably rectangular cross-section, in which is disposed a lock slide 68, which is of greater length than the tubular guideway 66 and is preferably formed with lower outer end projections 70, of reduced thickness adapted to fit within an annular groove 34, of a lock post 32. Each lock slide 68 is also formed with a reduced inner upper end projection 71, forming a recess 72, between it and the top wall of the arm 50, for a purpose which will hereafter be made apparent. Each slide 68 is also provided with an upstanding pin 74, adjacent its inner end, which projects through the elongated slot 76, formed in the top wall of the guideway 66, and preferably extending inwardly therein from its inner edge.

It will be apparent, that the upper mold frame section 36 may be lowered upon frame section 16, center guide post 26 fitting into and extending above the hub 44 and lock guide posts 32 extending through openings 64 in the plates 58, and the openings 64 in the arms 50. In this position parts 10 and 12 will interfit with one another and with mold part 14, which may have previously been disposed on mold part 10. Arms 50 may then be depressed against coil springs 62 until the forward end portion of each slide 68 is disposed opposite a groove 34 of a guide post 32; the slides 68 being then moved to have their ends 70 engaged within such grooves, to thereby lock the two frame sections together.

The mold frame is designed to be supported on a platform generally designated as 80, preferably formed with rollers 82, which is disposed in front of the opening of a curing oven (not shown) and a cooling tank (likewise not shown) for easy movement toward and away from the oven, and the cooling tank. Means are provided for mechanically raising and lowering the upper frame section 36 and for mechanically locking it in place on lower frame section 16 upon being lowered in place, and for unlocking it before raising it. To that end there is provided orienting means for disposing the mold frame in identical position each time it is prepared for separation of its sections so as to be in exact and proper position for engagement of the upper frame section 35 by the mechanical elevator means that are fixed in place over the platform. Such orienting means may comprise a plate 84, projecting from an edge of the platform (FIG. 6) and a pair of guide plates 86, projecting from the edge of the lower frame section base, which are spaced to receive between them, in closely fitting relation, the plate 84. Preferably the side edges of the plate 84 converge outwardly and the corresponding edges of the plate 86 diverge conformingly outwardly to facilitate the positioning of the mold frame in the predetermined arrangement.

The elevator means comprises an upright post 90, preferably consisting of an I-beam which is uprightly disposed adjacent the edge of the platform 80 and extend to a substantial height thereabove, as to the ceiling of the structure in which the installation is housed, and preferably disposed opposite the center of the mold frame when the latter is in servicing position, at an angle of 90° to the plate 80. The post 90 is provided, at its upper end, with an arm 92, extending laterally over the mold frame servicing area of the platform 80, which supports a two-way pneumatic cylinder 94, whose piston 96, carries the upper mold frame section elevator mechanism.

Such elevator mechanism comprises an elongated tubular hub 98, which is engaged by its upper end portion over the end of the piston, 96, and which supports at its lower end radiating, horizontally disposed arms, each designated as 100, equal in number to the number of arms 50 and disposed at corresponding angles to one another as arms 50. Each of the arms 100 may preferably be of squared channel shape with the channel opening preferably upwardly disposed, and may be braced by brace bars 102, which may likewise be of squared channel shape, preferably disposed with their openings downwardly facing, each secured by one end to one end of an arm 100 and by its other end to the hub 98. Each of the arms 100 and its brace bars 102 are provided with registering openings 104 and 106, in their bottom and top walls, respectively, arranged to fit over the guide posts 32, and means are provided for maintaining said openings 104 and 106 to be at all times in register with such guide posts 32, when the mold frame is in servicing position. Such orienting means may consist of a slotted extension 108, at the end of one of the brace bars 102 whose slot is engaged and guided over the leg of a T-bar 110 which is uprightly mounted on the post 90.

The bottom wall of each of arms 100 is also provided inwardly of the opening 104 with an elongated slot 111, corresponding in position and length to slot 76 in the guide way 66 through which the pin 74 of the lock slide 68 may project when the arm is disposed thereover. The underside of each of the arms 100 is also provided, at the inner edge of the slot 111, with an inwardly recessed member 112, whose recess 114, may receive and engage the inner projection 71 of the lock slide 68.

The sides of each channel arm 100 are provided with slots 115, through which extends a link 116, which is slidable within the slots 115 and is provided with an opening 118, in the portion thereof encompassed between the walls of the channel arm 100 through which pin 74 of the lock slide may project.

A shorter end of each link 116, to one side of opening 118, projects to one side of the arm 100 and is pivotally secured to a lug, 120, fixed to that side of the arm 100. The other larger end of the link 116 projects from the other side of the arm 100 and is pivotally connected to a stud 112, at one end of a two-way air cylinder 124, whose piston 126, is pivotally connected to a lug 128, fixedly secured to the adjacent arm 100 adjacent its other end.

This comprises the description of the mold frame of the present invention and the apparatus for assembling and disassembling it. The method of use of the mold frame and apparatus will now be described.

Initially, the upper mold frame section 36 may be disposed over the lower mold frame section 16 by fitting openings 51 and 64 of the upper mold frame section over the posts 32. Thereafter, the mold frame may be moved to servicing position, as illustrated in FIG. 6. The positioning of the mold in servicing position actuates a limit switch 130, set in the edge of the orienting plate 84 which is connected in the circuit of a solenoid actuated valve, diagrammatically shown at 132 in FIG. 8 of the drawings, which is arranged in the conduit leading from an air compressor 134.

Valve 132 is provided with two outlets, one leading to a conduit handle 140, and has its two outlets connected by two conduits 142 and 144, to the other two inlets of the pneumatic cylinder 94. The other conduit 146, from valve 132 leads to a valve 148, having a handle 150, whose two alternate outlets are connected by conduits 152 and 154, to two headers 156 and 158, from one of which three branch conduits each leads to the propel end inlet of an air cylinder 124 and from the other of which three branch conduits each leads to the repel inlet of an air cylinder 124. Each of the valves 138 and 148 is preferably mounted on the platform 80, in orienting plate 84, with their handles projecting thereabove as shown in FIG. 6 of the drawings.

After the positioning of the mold frame in servicing station and valve 132 is automatically opened, valve 138 is moved to admit air into the cylinder 94 through its propel end. This causes piston 96 to be moved outwardly and to lower the elevator with its arms 100 over the end portions of the guide posts 32 and to bring arms 100 to rest on top of the guideways 66 with each pin 74 projecting through slot 111 in the lower wall of each arm and through opening 118 in the link 116 passing through such arm and press the arms 50 against spring 62 to bring slide projections 70 in register with groove 34.

Thereafter, the handle of valve 148 is moved to pass air through the repel inlet of the cylinders 124. This will cause a portion of each link 116 supported within slots 115, of each of arms 100, to move outwardly and thereby move each pin 74 and its supporting lock slide 68 outwardly to engage its projection 70 in the adjacent groove 34 of a post 32. Thereafter valve 148 may be moved to reverse the direction of air flow through cylinder 124, to admit air into the propel end. This will cause the cylinders 124 to be moved in a direction to move links 116 with slots 115 inwardly thereby releasing slides 58 from lock posts 32 and engaging their projections 71 within the recess 114 of member 112 supported on the bottom walls of the arms 100. This operation releases the upper mold frame section 36 from the lower mold frame section 166 and engages it on the elevator. Thereafter, valve 138 is reversed to admit air into the repel end of the cylinder 94, to raise the elevator and with it the upper mold frame section 36 engaged on it to permit the filling of lower mold part 105 with mold powder.

After the lower mold parts 10 are filled with mold powder, mold part 14 may be arranged to place therein. Upper mold frame section 36 may then be lowered upon the lower mold frame section 16 by again reversing valve 138 to lower the elevator and mold frame section 36 supported by it, into place on mold frame section 16. Valve 148 is then moved in the direction to cause the portions of links 116 supported in arms 100 to move outwardly for interlocking the two mold frame sections and simultaneously releasing the upper mold frame section 36 from the elevator. The elevator may then be raised and the mold frame sections with the filled and locked mold posts moved into the curing oven, cooling tank, and thereafter returned to servicing station for separation of the mold frame section, removal of the molded articles and reassembling the mold frame sections to repeat the cycle.

It may here be stated that, while pneumatic means may be preferable for effecting the movement of the elevator structure, particularly in view of the necessity of compressing the arms 50 to locking position; other than pneumatic means, such as electrical means, as solenoid means, may be utilized with equal effect, for moving slides 68 into and out of locking position and into and out of engagement with the elevator.

This completes the description of the operation and use of the mold frame of the invention and its associated automatic manipulating structure. It will be readily apparent that such mold frames are of relatively simple, sturdy and economical structure, and especially adapted for automatic mechanical handling, and capable of supporting a plurality of molds for simultaneous processing. It will also be apparent that the automatic mechanism for assembling and disassembling the mold frame sections is highly effective and efficient for its purpose, permits servicing of the molds with a minimum of physical effort at a rapid rate of speed, thereby reducing the molding cycle time and effecting economy in the molding costs. It will also be apparent that numerous variations and modifications may be made in the mold frames and the mold frame handling apparatus of the invention, by anyone skilled in the art, in accordance with the principles of the invention hereinabove set forth, and without the exercise of any invention ingenuity. I desire, therefore, to be protected for any and all such variations and modifications that may be made within the spirit of the invention and the scope of the claims hereto appended.

What I claim is:

1. A mold and frame assembly, comprising a first mold section including a base portion, said base portion having a plurality of upright mold part supporting elements mounted thereon, at least one mold part supported on said element, and a plurality of spaced upright guide-and-lock posts mounted thereon, and a second frame section comprising a base portion having a plurality of dependent supporting elements for complementary mold parts mounted thereon, and at least one mold part supported on said last-named element, and a plurality of guide-and-lock posts admitting openings formed therein, said openings arranged to dispose said mold parts and said complementary mold parts in register when said openings are fitted over said guide-and-lock posts, and cooperating means connected to said second frame section and on said guide-and-lock posts for releasably interlocking said second frame section and said guide-and-lock posts, with said mold parts engaged on one another.

2. The mold and frame assembly of claim 1, wherein said cooperating means include resiliently, downwardly-compressible and laterally-moving elements mounted on said base portion of said second frame section.

3. The mold and frame assembly of claim 2, wherein said laterally-moving element includes means engageable by an elevator structure for raising said second frame section from and lowering it upon said guide-and-lock posts.

4. The mold and frame assembly of claim 1, wherein said cooperating means comprises a centrally-mounted upright guide post on the base portion of said lower frame section, a correspondingly-disposed opening for said guide post in the base portion of said second frame section, a hub element above said base portion of said second frame section adapted to fit over said guide post and a plurality of arms radiating from said hub, said arms each arranged to register with one of said guide-and-lock posts of said first frame section and each having an opening formed therein for admitting a guide-and-lock post therethrough, means resiliently connecting each said arm to said base portion of said second frame section normally maintaining said arms in spaced relation to said base portion of said second frame section, a lock tongue slidably supported on each said arm and a detent notch formed in each said guide-and-lock posts adapted to receive said lock tongue when said arms are depressed towards said base portion of said second frame section.

5. The mold and frame assembly of claim 4, wherein each said lock tongue is provided with means engageable by an elevator structure for raising said second frame section from and lowering it upon said lock-and-guide posts and said guide posts.

6. The mold and frame assembly of claim 4, wherein a lock tongue guideway is provided on each said arms adjacent the guide-and-lock post-admitting opening therein and a lock tongue is slidably disposed within said guideway, said lock tongue being of a length not less than the length of said guideway and having a portion at one end projecting from said guideway when said lock tongue is in disengagement from said guide-and-lock post, whereby said lock tongue may be engaged by an elevator structure for raising said second frame section from and lowering it upon said lock-and-guide posts and said guide post.

7. The mold and frame assembly of claim 4, wherein each said lock tongue is provided with means engageable for moving said lock tongue in and out of guide-and-lock post-admitting position.

8. The mold and frame assembly of claim 4, wherein a lock tongue guideway is provided on each of said arms adjacent said guide-and-lock post-admitting opening therein, said lock tongue is slidably disposed within said guideway, said guideway having an elongated opening formed therein, said lock tongue having a pin set thereinto and projecting through said opening, said pin engageable for sliding said lock tongue into and out of locking position.

9. Molding apparatus, comprising, in combination, a mold frame assembly including a lower mold-part-supporting frame section having upright guide posts extending therefrom and an upper mold-part-supporting frame section including a top wall having guide openings for said guide posts, and means on said top wall releasably interlocking said top wall with said guide posts, said interlocking means including members movable into and out of engagement with said guide posts, and vertically reciprocable means releasably engaging said upper mold frame section for raising said upper frame section from and lowering said upper frame section upon said guide posts, means supporting said reciprocable means for vertical reciprocation, means actuating said reciprocable means, mechanism on said reciprocable means for moving said interlocking means into and out of locking position, and cooperating means on said reciprocable means and said upper frame section for engaging said upper frame section on said reciprocable means upon the movement of said interlocking means out of locking position and releasing said upper frame section from said reciprocable means upon movement of said interlocking means into locking position.

10. The molding apparatus of claim 9, wherein means are provided operatively interconnecting said mechanism and said cooperating means on said reciprocable means for engaging said upper frame section with said reciprocable means simultaneously with the movement of said interlocking means out of locking position and releasing said upper frame section from said reciprocable means simultaneously with the movement of said interlocking means into locking position.

11. The molding apparatus of claim 9, wherein a platform is provided for supporting said frame assembly and wherein the means actuating said reciprocable means comprises an air cylinder mounted above said platform, said air cylinder having a plunger connected to said reciprocable means.

12. The molding apparatus of claim 11, including means disposed adjacent said platform for controlling the flow of air into said air cylinder.

13. The molding apparatus of claim 9, wherein means are provided for inhibiting axial rotation of said reciprocable means and cooperating means are provided on said lower frame section and said platform for positioning said frame assembly to position said frame assembly with its interlocking means in register with said mechanism and its said reciprocable means interengaging means in register with the cooperating interengaging means on said reciprocable means.

14. The molding apparatus of claim 9, wherein said interlocking means comprises a plurality of arms provided on said upper frame section, said arms radiating from a central point, each said arm having an opening formed therein, said arms and said openings therein arranged to have the said opening in each of said arms fit over one of said guide posts and a lock tongue is slidably supported on each of said arms for movement in and out of engagement with the adjacent guide post, and means are provided on each said lock tongue engageable by said mechanism.

15. The molding apparatus of claim 14, wherein the cooperating means on said upper frame section for interengagement with said reciprocable means are provided on said lock tongue.

16. The molding apparatus of claim 14, wherein each said lock tongue is formed with a projection and means are provided on said reciprocable means for receiving said projection upon movement of said tongue out of locking position, said tongue releasable from said last-named means upon movement thereof into locking position.

17. The molding apparatus of claim 14, wherein the means on each said tongue engageable by said mechanism comprises an upright pin extending upwardly from said tongue and said mechanism comprises a plurality of arms each pivotally supported on said reciprocable means, each said arm having an opening arranged to receive one of said pins, and means are provided on said reciprocable means, controllable from a point adjacent said platform, for moving said arms.

18. The molding apparatus of claim 17, wherein each said lock tongue is formed with an upwardly-projecting pin and means are provided on said reciprocable means for receiving said pin upon movement of said tongue out of locking position, said tongue releasable from said last-named means upon movement thereof into locking position.

19. The molding apparatus of claim 17, wherein said controllable means for moving said arms on said reciprocable means comprises an air cylinder and piston connected to each said arm, conduit means connecting said air cylinder to a source of air under pressure, and an air flow control valve in said conduit means mounted adjacent said platform.

References Cited by the Examiner
UNITED STATES PATENTS

| | | | |
|---|---|---|---|
| 1,965,732 | 7/1934 | Bisterfeld | 18—20 |
| 3,000,056 | 9/1961 | Parsch | 18—43 |
| 3,015,846 | 1/1962 | MacMillan et al. | 18—26 |

J. SPENCER OVERHOLSER, *Primary Examiner.*

E. MAR, *Assistant Examiner.*